Figure 1:
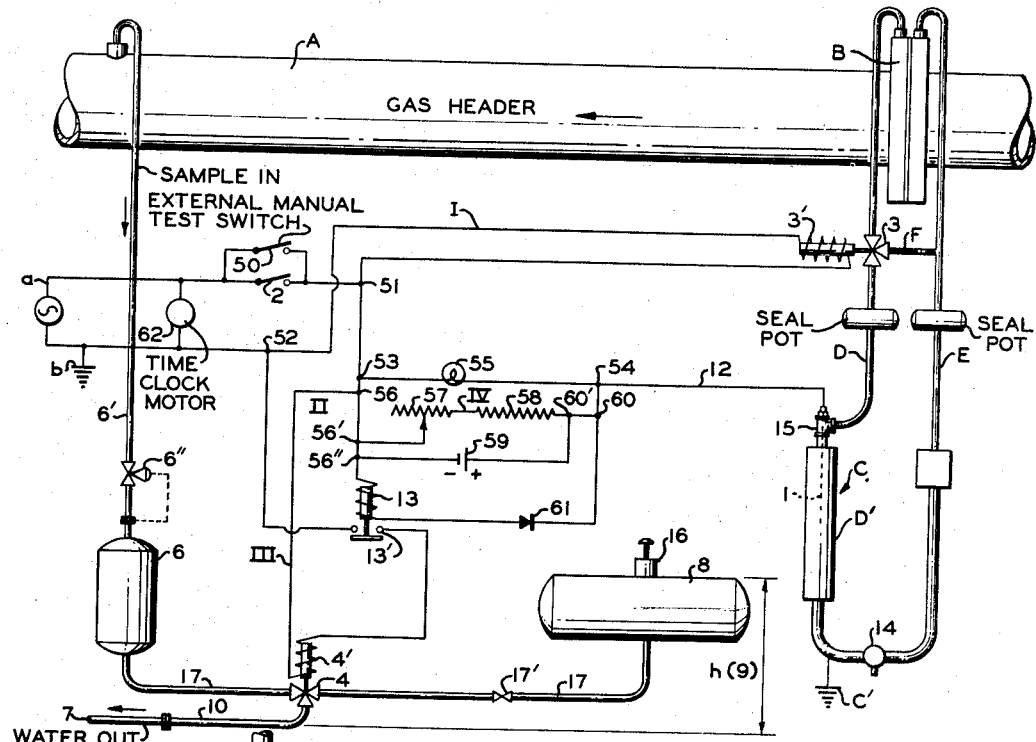

July 7, 1959

J. J. FOX ET AL 2,893,412

FLUID PROPORTIONING

Filed Sept. 12, 1955

3 Sheets-Sheet 1

INVENTOR.
J. J. FOX
R. M. WHITE
BY
Hudson & Young
ATTORNEYS.

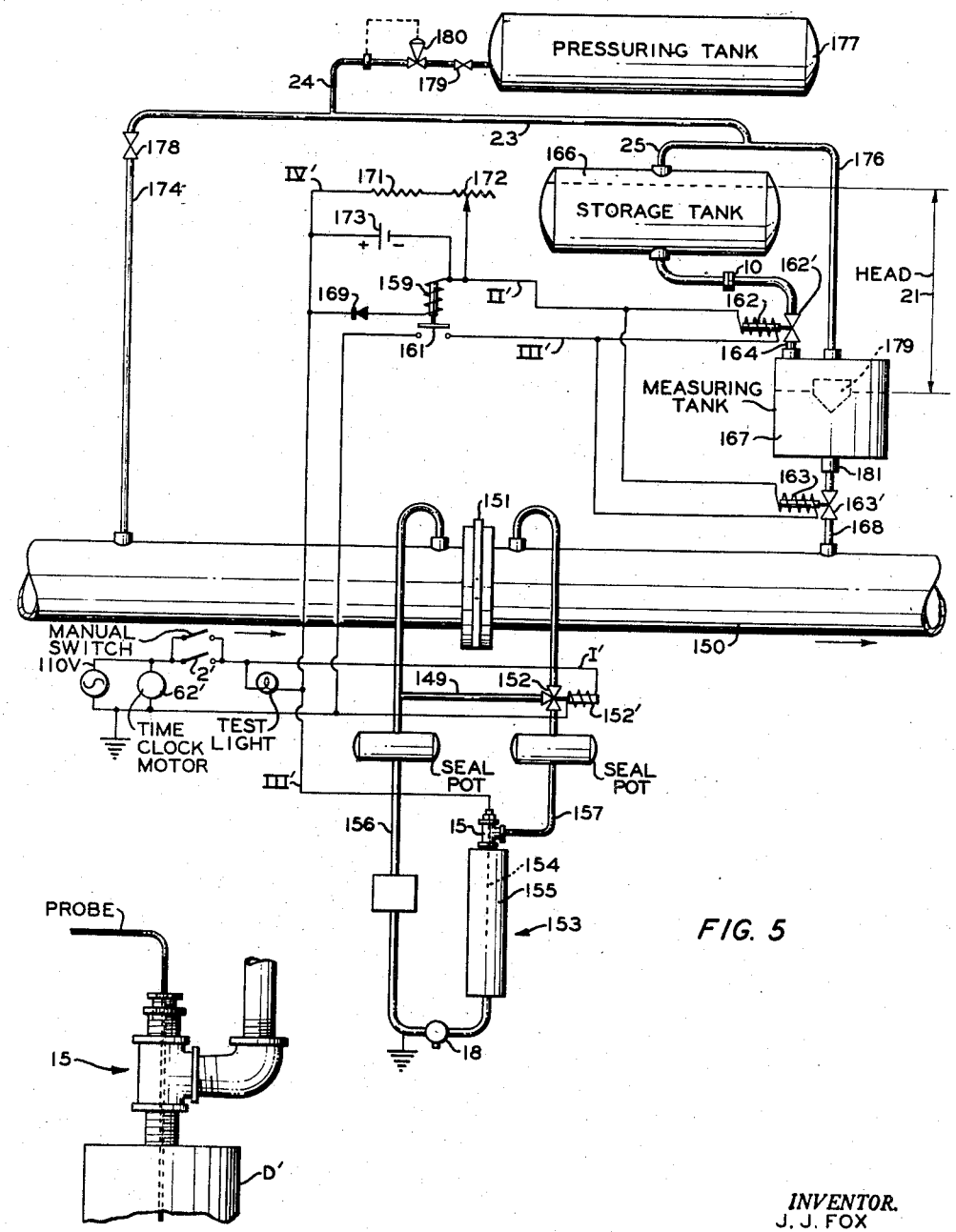

July 7, 1959     J. J. FOX ET AL     2,893,412
FLUID PROPORTIONING

Filed Sept. 12, 1955     3 Sheets-Sheet 3

INVENTOR.
J. J. FOX
R. M. WHITE
BY
ATTORNEYS

United States Patent Office 2,893,412
Patented July 7, 1959

2,893,412

FLUID PROPORTIONING

Jack J. Fox, Phillips, Tex., and Royce M. White, Bartlesville, Okla., assignors to Phillips Petroleum Company, a corporation of Delaware Application September 12, 1955, Serial No. 533,734

11 Claims. (Cl. 137—3)

This invention relates to method and apparatus for proportioning fluids. In one aspect this invention relates to a method for proportioning fluids by establishing a pressure differential across a first fluid stream effecting action on a measuring agent commensurate with the degree of said differential, terminating said differential and flowing a second fluid while the said measuring agent recovers from said action of established differential. In another aspect this invention relates to apparatus suitable for carrying out method described herein. Other aspects and advantages of this invention are apparent from a perusal of this disclosure, the drawings and the appended claims.

This invention is advantageously applied to the sampling of fluid from a moving fluid stream in composite proportions, and in proportioning fluid flows, particularly when mixing one fluid with a relatively large amount of another.

An object of this invention is to provide a method for porportioning of fluids. Another object is to provide a method for obtaining a weighed average sample of fluid from a moving fluid stream over prolonged periods. Another object is to provide a process for proportioning a fluid into a moving stream of relatively large volume. Another object is to provide apparatus for proportioning fluids. Still another object is to provide a weighed average gas sampling device. Other objects and advantages of this invention are apparent from a perusal of this disclosure, the drawings and the appended claims.

In accordance with this invention a method is provided for proportioning fluids comprising establishing a pressure differential across a moving stream of a first fluid; effecting action on a measuring agent to an extent commensurate with degree of said differential; terminating relation between said differential and measuring agent; and maintaining flow of a second fluid while said measuring agent recovers from the said action of the differential.

Further, in accordance with this invention there is provided apparatus suitable for proportioning fluids comprising a conduit for conveying flow of a first fluid; means associated with said conduit for inducing a pressure differential in said conduit when fluid is passed therethrough; pressure differential measuring means utilizing displacement of an electrical conductive measuring fluid, adapted to measure said differential; means for terminating said differential; a first electrical circuit containing said measuring fluid when the said fluid is displaced in response to said differential, and broken when said fluid is in a position independent of said differential; a chamber, and a valved outlet therefor; an electrical switch-actuating means in said first circuit, responsive to current passed through said first circuit; a second electrical circuit; electrical switch means in said second circuit for controlling flow of current through said second circuit, and operatively connected with said switch-actuating means; and electrical valve-actuating means in said second circuit, responsive to current passed therethrough and operatively connected with said valve in said chamber outlet.

Figure 3A:
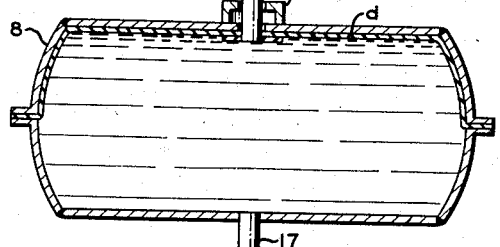
Figure 3B:
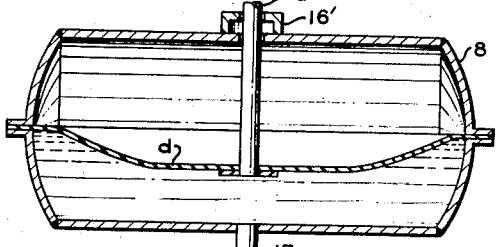
Figure 2:
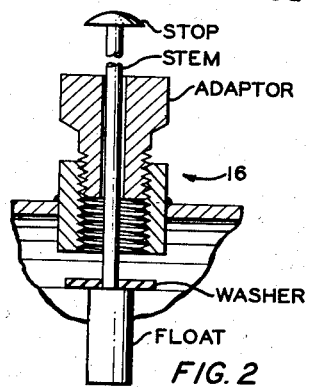
Figure 6:
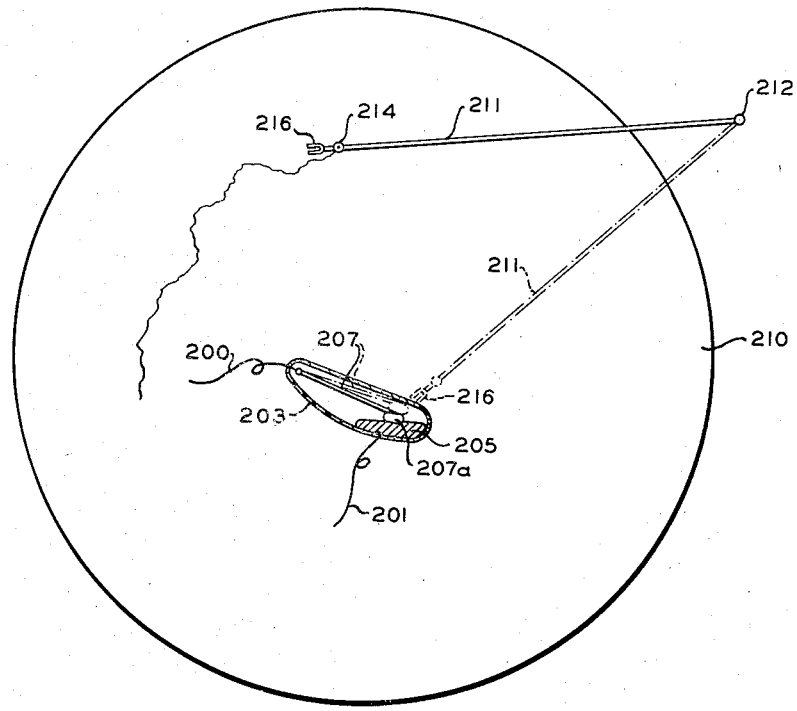

Our invention is illustrated with reference to the attached drawings of which Figure 1 is a diagrammatic showing of a proportioning device of this invention utilized as an automatic weighed average gas sampler; Figure 2 is illustrative of a float valve assembly that can be employed in the structure of Figure 1 (element 16); Figures 3a and 3b are illustrative of a diaphragm type valve that can be employed in lieu of element 16 of Figure 2; Figure 4 is illustrative of electrode structure of Figure 1 referred to herein as a probe or probe wire, and means for securing the same; Figure 5 is illustrative of a proportioning device, and its operation, utilized in accordance with this invention for mixing small amounts of a first fluid with relatively large amounts of a moving stream of a second fluid; and Figure 6 illustrates specific structure by which sampling of fluid can be achieved proportionate to its rate of flow in lieu of probe structure of Figures 1 and 5.

With reference to Figure 1, gas header A such as a pipe line through which gas is transported, contains differential producing means B, such as an orifice flange, for establishing pressure differential in the header when fluid is passed therethrough. Differential measuring means C is any suitable device for measuring pressure differential across element B such as an orifice meter or conventional U-tube type manometer employing an electrical conductive measuring liquid, generally mercury. Arms D and E of manometer C extend to orifice B and are operatively connected therewith to measure differential across orifice B and to manifest same by difference in height in the columns of measuring liquid in the manometer, mercury being referred to hereinafter for purpose of illustration as the measuring liquid employed. Thus, when gas passes through header A in the direction shown by the arrows, the height of mercury liquid in arm D, the low pressure side of the manometer is higher than that of mercury in arm E. Conduit F connects arms D and E and contains 3-way valve 3 adapted to operate in conjunction with arm D to prevent flow of gas through conduit F while measuring differential across orifice B and to be turned so that gas can flow from the high pressure side of the orifice through valve 3, when it is desired to eliminate the said differential across the manometer. Valve 3 is adapted to control direction of flow fluid therethrough, and is adapted to be moved into operating position by action of solenoid 3'. Valve 3 is normally closed to the flow of fluid through conduit F and thereby maintain a differential across the manometer C. Electrode or probe wire 1, a suitable electrical conductor, extends into low pressure side arm position D' a distance such that when mercury columns in arms D and E are at the same level, probe 1 terminates above and out of contact with the mercury. Gas storage chamber 6 is connected with header A via conduit 6', at a point downstream from orifice B as shown by the arrows. Back pressure regulator 6" in line 6' is set to maintain chamber 6 at a pressure below that of header A, generally from about 5 to 10 pounds lower. Storage chamber 8, preferably elongated to permit liquid flow therefrom with minimum loss of hydrostatic head is connected with chamber 6 via conduit 17. Orifice valve 17', in line 17, is adjustable to control rate of fluid flow through conduit 17. Three-way discharge valve 4, in line 17, is adapted to control direction of liquid flow therethrough, i.e., from conduit 17 into conduit 10 or through conduit 17 from chamber 6 to chamber 8 and is adapted to be moved into an operating position by solenoid 4' whereby liquid will flow from conduit 17 through conduit 10. Valve 4 is normally closed to conduit 10. Conduit 10 is connected with valve 4 to receive discharge of liquid from chamber 8.

Timer means, as shown with reference to timer motor 62, supplied by electric current from terminals *a* and *b* (110 volts) is connected through switch 2 to cyclically open and close switch 2. Switch 2 forms a part of four circuits described hereinafter, all 110 volt circuits. Any suitable voltage can be utilized, but 110 volt A.C. is preferred.

Circuit I comprises the 110 volt source, terminal *a*, timer 62, switch 2, and solenoid 3' by way of junctions 51 and 52, and ground terminal *b*. Solenoid 3' is operatively connected with valve 3 so as to cause valve 3 to move into an operating position.

Circuit II comprises the 110 volt source, terminal *a*, timer 62, switch 2, solenoid 13, the latter adapted to cause solenoid switch 13', described hereinafter, to move into an operating position, rectifier 61, probe 1, ground *c'* and grounded terminal *b* when there is contact between probe 1 and mercury in arm D'. Circuit II includes terminals 51, 53, 56, 56', 56", 60, and 54.

Circuit II comprises 110 volt source, terminal *a*, terminals 51, 53, 56, solenoid 4', solenoid switch 13', normally open, terminal 52 and grounded terminal *b*.

Circuit IV is a time-delay circuit containing sufficient resistance and capacitance to provide a time delay in the order desired, generally from 5 to 10 seconds. Circuit IV includes terminals 56', 56", terminals 60 and 60', fixed resistance 58, variable resistance 57, and capacitor 59 as a shunt around elements 57 and 58.

Test light 55 connects terminals 53 and 54 and indicates the time at which the mercury level falls beneath the probe wire end, in arm D'. The light is an aid particularly in calibrating height of the probe relative to the duration of time delay.

With reference to Figure 2 is shown a float valve 16 employed with reference to Figure 1, see chamber 8. As illustrated, valve 16 in one form can be fabricated from a tubing adaptor with its bore enlarged, and a plastic float with rubber washer valve seat. The float drops immediately as liquid level in chamber 8 decreases and air is drawn in around the loosely-fitting shaft. When liquid, as described, hereinafter, is passed into chamber 8 at a pressure often as high as about 50 p.s.i.g., the float closes and seats with rapid motion. Float 16 allows chamber 8 to become liquid full before it closes off, it being important to prevent entrapment of any air in chamber 8 because the air will be compressed and cause excessive flow rates of liquid from chamber 8 in operation described hereinafter.

With reference to Figures 3*a* and 3*b*, is shown a diaphragm-type valve 16' that can be employed in conjunction with chamber 8 of Figure 1 in lieu of float valve 16. Thus, in Figure 3*a* is shown chamber 8 filled with liquid and closed by diaphragm *d*, connected with valved conduit *d"*, and forming a top side of chamber 8. When chamber 8 is filled with liquid, flexible diaphragm *d* is pressed against the top of the vessel. When liquid flows from chamber 8, diaphragm *d* falls and clings to the surface of the liquid. Diaphragm *d* thus permits movement of liquid from chamber 8 without air contacting the liquid within chamber 8. Figure 3*b* shows the position of diaphragm *d* when a portion of liquid is gravitated from chamber 8. When filling chamber 8 with liquid in initiating operation, valved conduit *d"* will be open to permit displacement of air from chamber 8 so as to completely fill chamber 8 with water. Thereafter valved conduit *d"* is closed.

With reference to Figure 4 it is shown one manner in which probe wire 1 is secured in manometer arm D'. Pressure type connection 15 is a conventional static element pressure gland and is insulated electrically from adjacent equipment.

With reference to Figure 5 conduit, or header, 150 conveys fluid flow in a direction shown by the arrows. Conduit 149, conduit 150, orifice 151, valve 152, solenoid 152', manometer 153, probe 154, manometer arms 156 and 157, solenoids 159 and switch 161 all correspond in structure and function respectively to elements F, A, B, 3, 3', C, 1, D and E, 4', and 13' respectively.

Circuit I' corresponds to circuit I of Figure 1.

Circuit II' corresponds to circuit II of Figure 1.

Circuit III' is similar to conduit III of Figure 1 but includes solenoids 162 and 163 (corresponding to solenoid 4' of Figure 1) in parallel. However, valve 162' in conduit 164 adapted to be operated by solenoid 162 is normally closed (when no current is passed through solenoid 162), whereas valve 163', in conduit 168, operated by solenoid 163, is normally open with no current flowing in solenoid 163.

Storage tank 166 is connected by conduit 164 with measuring tank 167 and the latter is connected with header 150 by conduit 168, at a point downstream from orifice 151, as shown by the arrows.

Circuit IV' corresponds to circuit IV of Figure 1, i.e., is a time-delay circuit, fixed resistance 171, variable resistance 172 and condenser means 173 shunted around elements 171 and 172, preferably a plurality of capacitors.

The function of delay circuits IV and IV' is discussed hereinafter with reference to measurement of the break in circuit I that takes place when contact between probe and mercury is broken.

Equilizer conduit 174 connects conduit 150 at a point on its high pressure side with storage tank 166. Conduit 176 connects measuring tank 167 with storage tank 166 also as an equilizer line. If desired, a pressure tank 177 can be connected with conduit 174 via conduit 24 to supply necessary pressure to tank 166 to facilitate flow therefrom. When vessel 177 is in use, valve 178 is closed, valve 179 is opened and back pressure valve 180 maintains a constant pressure in vessels 166 and 167.

Float valve 179 in tank 167 is adapted to seat in seat 181 to prevent excess loss of pressuring product from tank 167.

In the operation of the embodiment of Figure 1, gas is passed through conduit or header A such as a commercial size pipe line and is sampled periodically proportionate to the rate of gas flow in the header providing, therefore, for a composite sample of all gas passed through the header over a prolonged period.

A pressure drop is developed across orifice B, the high and low pressure side being indicated by directional flow shown (arrows). A difference in height of mercury columns in manometer C manifests pressure differential across orifice B. At predetermined intervals, timer 62 closes switch 2 causing solenoid 3' to move valve 3 into operating position permitting flow of gas through conduit F thus equalizing pressure on the manometer arms D and E and terminating the said differential across the manometer C and permitting the two mercury columns in arms D and E to seek the same level. After the mercury in arm D has descended, sampling is effected until vessel 8 is filled with liquid from vessel 6 and normal pressure is reached in vessel 6. Because the original height of mercury in column D is a measure of the flow rate of gas through header A, the duration of sample extraction and, consequently, the amount of sample taken, is, likewise, a function of flow of gas through header A. It is seen, therefore, that a basic concept of our invention is in a combination of steps providing establishment of a pressure differential across a moving stream of first fluid, effecting action of a measuring agent, in this case the mercury column in arm D, to an extent commensurate with the degree of differential, terminating the said effecting action on the measuring agent and maintaining flow of a second fluid while the measuring agent recovers from the said action of the differential, the measuring agent in this case being the column of mercury, and the recovery being the reaching of the same level by the two mercury columns.

Action of timer 62, as described, to close switch 2, causes flow of current through circuit I to activate solenoid 3' to move valve 3 into an operating position permitting flow of gas through line F into header A, and the lower part of arm D. Switch 2, now closed, provides supply of current to circuit II to actuate solenoid 13 and to cause switch 13' to move from its normally open position to a closed position thus completing circuit III and causing solenoid 4' to move valve 4 into position for permitting gravitation of liquid from chamber 8 into and through conduit 10. Upon assumption of the "no differential" position of mercury columns in manometer C, contact of probe 1 with mercury therein is broken and circuit II is, therefore, broken. After a period of time, as determined by the delayed circuit IV, solenoid 13 is deenergized and solenoid switch 13' then moves back to its normally open position to terminate operation of solenoid 4' to cause valve 4 to move to its normal position permitting flow of fluid through line 17 from chamber 6 to chamber 8. Circuit I is closed for duration of the predetermined time interval, generally 60 seconds each hour. Reservoir chambers 6 and 8 are initially filled with a gas-confining liquid, preferably salt water, or any suitable low freezing point liquid of low hydrocarbon solubility. Vessel 6, always open to header A, receives gas therefrom and liquid in chamber 6 is displaced through conduit 17 into chamber 8 to the extent that chamber 8 is filled with liquid. This, of course, takes place only when valve 4 is adapted to permit flow between chambers 6 and 8. Chamber 8 discharges a volume of water commensurate with time required for the mercury column in arm D of manometer C to assume a "no differential" position and is thus proportional to rate of gas flow through header A. The amount of confining liquid, e.g., water thus replaced in chamber 8 by displaced water from chamber 6 is equal to the volume discharged from chamber 8 and is, therefore, proportional to the rate of flow of gas through header A.

At the end of the predetermined time cycle, i.e., for sampling, valve 3, no longer acted upon by solenoid 3', assumes its non-operating position and differential is again set up across manometer C. The sampling operation cycle is then repeated.

We have found that when employing a device of Figure 1, as described, a composite weighted average sample can be obtained from a moving stream in header A over prolonged flow periods, as, for example, from one to six weeks or longer, when desired.

In the above described sampling procedure, the amount of gas sample extracted is directly proportional to the "root" value of the flow differential, root reading being the square root of the inches of water differential and as such is directly proportional to flow through header A. The fall of mercury is advantageously calibrated by valve 14 in manometer C so that a mercury height equivalent to 100 inches of water differential will fall to equilibrium in 60 seconds. Valve 14 is closed until the acceleration of the drop of mercury is insignificant. Thus, the maximum open time of discharge valve 4 is the maximum timer output. For less than maximum sample discharge, pressure equalizing valve 3 will continue to be in the operating position until the remaining time of the 60 seconds period has ensued. When the 60 second period has elapsed, the valve 3 returns to its non-operating position as above described, and the mercury column assumes position indicative of the gas flow header rate. Although the period of time during the fall of the mercury is a rigorously true function of metered gas flow in header A, it is generally necessary to employ a time delay circuit IV to correct for the time interval while the mercury travels from the end of probe 1 until it is level in arms D and E. The temperature coefficient of expansion of mercury, along with that of any other variables involved, is such that yearly ambient temperatures could vary the rest position surface of the mercury within the range equivalent of about 0.5 root. If the probe 1 were set within ½ root of the no differential level of the mercury, it is possible that there might be instances when contact would not be broken between probe 1 and the mercury during the 60 second interval when valve 3 was in the operating position.

The incremental height of the mercury column is not directly proportional to gas flow rates but is proportional to the square of the flow rate, i.e., the square root of the mercury height is directly proportional to the gas flow rates. Accordingly, the inches of fall of the mercury column from ten roots to nine roots value is nearly two inches where the fall from one root to zero is about $\frac{1}{12}$ inch even though the times of fall are equal. The proportionality feature is gained from the fact that the higher mercury heights fall faster due to a higher head. Thus, a small discrepancy between the end of the electrode, or probe, and the mercury equilibrium point could impair the purpose of the time measurement. Accordingly, the probe is withdrawn to a finite distance above the equilibrium surface together with provision of a time delay function in the circuit, the time delay being precisely equal to the known time equivalent of the withdrawal distance, thus six seconds for one root, nine seconds for one and one-half roots, etc. Thus, the internal circuit, i.e., circuit I is broken when the mercury falls below the probe. The stored energy in the time delay circuit IV keeps valve 4 open during the time interval while the mercury travels from the end of probe 1 until level in arms D and E. The time delay circuit IV in form of a resistance-capacitance discharge circuit maintains flow of current to the water discharge valve. The actual time of delay is a function of the relative size of the capacitors and resistors in the circuit. The disruption of current in circuit I due to mercury falling below the probe, causes the controlled dissipation of energy stored in the condensers in circuit IV. Thus the solenoid 13 of Figure 1 will not be deenergized until the level of energy in the delay circuit fails to hold the switch 13' closed.

With reference to Figure 5, a small volume of liquid is proportioned into a moving stream of fluid of relatively large volume in conduit 150. Timer 62' connected with 110 volt terminal $a$ and ground $b$, actuates switch 2' and by circuit I', 3-way valve 152, normally closed, is moved into an open position to permit equalization of pressure across arms 156 and 157. Circuits II' and III' function in respect of solenoids 159 and switch 162, and probe 154, as described, with reference to corresponding parts of Figure 1. Thus, in operation when timer 62' and switch 2' cause valve 152 to open and equalize pressure across the manometer, solenoids 162 and 163 in parallel in circuit II are moved into an operating position, i.e., valve 162' is opened and valve 163' is closed. Thus, until the probe connection in circuit II' is broken and circuit III' is broken at switch 13', fluid will pass from storage tank 166 into measuring tank 167. When the circuit III' is broken, valve 162' will move into a normally closed position and valve 163' will move into its normally open position to permit flow of liquid from measuring tank 167 into header 150.

Delay circuit IV' corresponds to delay circuit IV of Figure 1 and functions in the manner, above discussed, to provide for necessary time delay to correct for inherent errors involved in measuring break in contact between the probe and mercury in the low pressure arm of the manometer, as described.

Thus, in accordance with the embodiment of Figure 5 is illustrated one manner in which in accordance with this invention a fluid can be proportioned into a relatively large volume of a moving fluid stream over prolonged periods of time.

The proportioning apparatus of this invention can be applied to numerous utilizations not specifically illustrated. Thus, in the petroleum industry, it is quite often necessary to blend small amounts of additives such as TEL fluid, dyes, inhibitors, and more recently, special additives such as upper cylinder lubricants and improving agents to gasoline. In the lubricating oil field, detergents, viscosity improvers, anti-oxidants, etc., are added in small quantities. In the liquefied petroleum gas field, odors must be added to provide safety for the users of the fuel. In all such blending operations, process and apparatus of this invention are particularly suitable for effecting the blending accuracy required, particularly as applied to blending small amounts of materials such fluid being transported through pipe lines.

The invention may be applied to sampling liquids. If the specific gravity of a liquid is less than that of the displacement liquid in the sampler (a 50 percent glycerin-water solution has a specific gravity of 1.13) then sample extraction of that liquid can be conducted under the same procedures as described for gas sampling. Less attention can be given to pressure regulation since the pressure would have no effect on the amount of sampled liquid available to the laboratory for analysis. Also, a much smaller volumetric amount of composite sample would be required for analysis purposes.

A pressure reducing valve would serve no purpose except in cases where excessive main line pressures must be isolated from the sampler to prevent damage to the equipment. A check valve should be installed to prevent reverse flow. Fluctuating header pressures would have no effect on the quantity or quality of the sample. If a high pressure liquid line is sampled and the sampling pressure is reduced to protect the equipment, it must be remembered to hold an excess of the vapor pressure of the sample to prevent flashing.

If liquid flowing through the main header is heavier than the displacement liquid, vessel 6 should be inverted. When vessel 6 is inverted, the inlet line 6' will enter from the bottom and outlet line 17 will enter vessel 6 from the top.

With reference to Figure 6 is shown structure by which sampling of fluids can be achieved in lieu of probe structure of Figures 1 and 5. A flow meter such as a recording orifice type meter of conventional design, not shown, is operatively connected with the manometer (arms D and E) of Figure 1 to measure differential across said manometer. Chart 210 of such recorder turns and pen 214 records the rate of flow of gas through the orifice B. Arm 211 is pivoted at point 212. Arm 211 is connected through a link mechanism to a float which rises on the surface of mercury in chamber C of Figure 1. As the mercury rises in chamber C, the arm 211 moves toward the outside of chart 210. When the mercury falls in chamber C, the arm 211 moves toward the center of the chart. A magnet 216 is at the unpivoted end of arm 211. Mercury switch 203 contains a body of mercury 205 in a lower portion, as shown. Arm 207 is adapted to be movable so as to have one end moved in and out of contact with mercury body 205. The end 207a of arm 207 is fabricated of material, or arm 207 contains such material affixed thereto, that can be attracted by magnetic force of magnet 216 when the latter is in predetermined proximity to said end 207a. When arm 207, pivotally fastened at one end and at that end connected to conductor lead 200, is not attracted by magnet 216, it extends into mercury body 205, thereby establishing electrical contact between leads 200 and 201, the latter connected with mercury body 205.

Leads 200 and 201 each connect respectively with line 12 and ground C', both of Figure 1.

Contact of arm 207 with mercury 205 provides electrical contact performing the same function as contact between mercury and probe 1 in chamber C, illustrated in Figure 1. As soon as valve 3 is opened, valve 4 is also opened (both of Figure 1), and liquid from chamber 8 is gravitated via line 10. Upon breaking said contact in mercury switch 203, such as when the levels of the mercury arms are about the same, that broken contact, as in chamber C of Figure 1, results in closing of valve 4, whereby the fluid drained from chamber 8 is proportionate in volume to the fluid sample to be taken in chamber 6. When mercury falls in leg D' of Figure 1, arm 211 moves toward the center of the chart, and magnet 216, at a predetermined position of arm 211 with reference to arm 207, draws arm 207 by magnetic attraction, from contact with mercury 205 and breaks the said electrical contact, to cause valve 4 to close with reference to flow of liquid from chamber 8.

Thus, as in operation of probe 1 of Figures 1 and 5, when valve 3 is opened, valve 4 in line 17 is opened and remains open until the mercury columns of manometer C reach about the same level. Arm 211 can be adjustably positioned to move in operative communcation with arm 207 at any predetermined differential in manometer arms D and E, although it is generally preferred that arm 211 be adapted to move arm 207 by magnetic attraction of arm 207 to magnet, when the levels of mercury columns are about the same.

It is to be understood that although preferably a differential flow type manometer is employed as described, any suitable means for adapting arm 211 to operate responsive to differential in any flow measuring means as the manometer (arms D and E) of Figure 1 can be employed.

It is to be understood that the invention is not limited to measurement of the pressure differential employing a U-tube manometer or a conventional type mercury flow-meter but that any measuring agent can be employed and flow of the second or proportioned fluid can be effected responsive to action on that measuring agent. Thus, a pressure measuring device embodying use of Bourdon tubes or one of the aneroid type can be employed. The period during which the coil or bellows requires for recovery from effect of the differential being that determinative of flow of the proportioned fluid and being a measure of the required proportions for effecting a fluid composite.

Reasonable variation and modification are possible within the scope of the foregoing disclosure, drawings and appended claims to the invention the essence of which is that (1) fluids are proportioned by establishing a pressure differential across a stream of a first fluid, effecting action on a measuring agent to an extent commensurate with degree of said differential, terminating relation between said differential and measuring agent, and maintaining flow of a second fluid while said measuring agent recovers from said action of said differential; (2) an apparatus suitable for carrying out such process; all as described herein.

We claim:

1. A method for proportioning fluids comprising establishing a pressure differential across a stream of a first fluid; effecting action on a measuring agent to an extent commensurate with degree of said differential; terminating relation between said differential and measuring agent; establishing flow of a second fluid following termination of said relation between said differential and measuring agent; and maintaining said flow of said second fluid for a time interval commensurate with recovery of said measuring agent from said action of said differential.

2. A method for proportioning fluids comprising establishing a pressure differential across a stream of a first fluid; measuring the said differential in terms of a difference in height of liquid columns; equalizing pressure on said columns by terminating the action of said differential on said columns; establishing flow of a second fluid substantially simultaneously with equalizing pressure on said columns; and maintaining flow of said second fluid for a time interval commensurate with the time required for said columns to reach the same level.

3. Apparatus comprising a conduit; means associated with said conduit for inducing a pressure differential in said conduit when fluid is passed therethrough; pressure differential measuring means utilizing displacement of an electrical conductor measuring fluid, adapted to measure said differential; means for periodically terminating said differential from said pressure differential measuring means; a first electrical circuit containing said measuring fluid when the said fluid is displaced in response to said differential, and broken when said fluid is in a position independent of said differential; a chamber, and a valved outlet therefor; an electrical switch-actuating means in said first circuit, responsive to current passed through said first circuit; a second electrical circuit; electrical switch means in said second circuit for controlling flow of current through said second circuit, and operatively connected with said switch-actuating means; and electrical valve-actuating means in said second circuit, responsive to current passed therethrough, operatively connected with said valve in said chamber outlet.

4. Apparatus comprising in combination a header conduit; means in said conduit for restricting flow of fluid therethrough; a U-tube type manometer containing an electrical conductor as a measuring liquid operatively connected with said flow-restricting means to measure pressure differential in said conduit; a first conduit connecting arms of said manometer to permit equalization of pressure across same; a first valve in said conduit; a probe, extending into a low pressure arm of said manometer so as to terminate above measuring liquid when liquid in both arms is at the same level; a timer; a first switch connected with said timer; a first electrical circuit containing said first switch and operatively connected with said first valve to move same to an operating position, in response to actuation by said timer through said first switch; a second electrical circuit, containing said first switch, and said probe, and adapted to actuate a second switch described hereinafter in response to actuation by said timer through said first switch, said second circuit being broken when measuring liquid in the said manometer arms reach the same level; a first reservoir; a valved conduit extending from said reservoir; a second conduit connecting said first reservoir with said header; a third electrical circuit connected with said first switch and containing said second switch, and operatively connected with said reservoir conduit valve to move same into an operating position in response to actuation by said second switch, and said first switch through said timer.

5. Apparatus in combination comprising a first conduit; an orifice in said first conduit; a U-tube type manometer containing an electrical conductor as a measuring liquid, operatively connected with said orifice to measure pressure differential across same; a first reservoir; a second reservoir; a second conduit connecting said first and second reservoirs; a conduit connecting arms of said manometer; a first valve in said connecting conduit, adapted to be regulated to control direction of fluid flow therethrough; a second valve, in said second conduit, adapted to be regulated to control direction of fluid flow therethrough; a first solenoid operatively connected with said first valve to move same to an operating position; a second solenoid operatively connected with said second valve to move same to an operating position; a third conduit connecting said first reservoir with said header conduit; a probe element extending into a low pressure side arm of said manometer and terminating at a point above the measuring liquid therein when the measuring liquid in both side arms are at the same level; a timer means; a first electrical switch connected with said timer; a first electrical circuit, connected with said first switch and containing said first solenoid; a third solenoid; a second electrical circuit, connected with said first switch and containing said probe element, and said third solenoid intermediate said first switch and said probe; a third electrical circuit connected with said first switch and containing said second solenoid; a second switch, in said third circuit adapted to be actuated by said third solenoid; a fourth electrical circuit connected with said first switch and formed from said third solenoid, a rectifier, a fixed resistance, and a variable resistance; and a condenser, as a shunt to said variable and fixed resistances.

6. A method for obtaining a weighed average fluid sample from a moving fluid stream, comprising establishing a pressure differential across said stream; measuring the said differential in terms of a difference in height of liquid columns; periodically terminating the action of said differential on said columns to permit said columns to seek the same level; maintaining liquid in a first storage zone and in a second storage zone; passing liquid from said first zone while said columns seek the same level, substantially simultaneously with termination of the action of said pressure differential on said columns; then passing liquid from said second zone into said first zone to compensate for the liquid initially passed from said first zone; maintaining said second zone in communication with said moving fluid stream to receive fluid therefrom, and passing fluid from said stream into said second zone to compensate for liquid passed therefrom to said first zone; and recovering fluid in said second zone as said average weighed sample.

7. Apparatus in combination comprising a header conduit; an orifice in said header conduit; a U-tube type manometer containing an electrical conductor as a measuring liquid operatively connected with said orifice to measure pressure differential across same; a first conduit connecting arms of said manometer, and a first valve in said first conduit adapted to be regulated to control direction of fluid therethrough; a storage reservoir; a metering tank; a first solenoid operatively connected with said first valve to move same to an operating position; a second conduit connecting said storage reservoir and said metering tank; a second valve, normally closed, in said second conduit; a second solenoid operatively connected with said second valve to move same into an operating position; a third conduit, connecting said metering tank with said header conduit on the low pressure side of said orifice when a fluid is passed through said header conduit; a third valve, normally open, in said third conduit; a third solenoid operatively connected with said third valve to move same into an operating position; a probe element extending into a low pressure side of said manometer and terminating at a point above the measuring liquid therein when measuring liquid in both side arms are at the same level; a timer means; a first electrical switch connected with said timer; a first electrical circuit connected with said first switch and containing said first solenoid; a fourth solenoid; a second electrical circuit connected with said first switch and containing said probe element, and containing said fourth solenoid intermediate said first switch and said probe, and being broken when measuring liquid in said manometer arms reach the same level; a second electrical switch; a third circuit connected with said first switch and containing said second switch and containing said second and third solenoids in parallel; said second switch being operatively connected with said fourth solenoid to move same into an operating position; a fourth electrical circuit connected with said first switch and shunting said fourth solenoid; a rectifier, a fixed resistance and variable resistance in series in said fourth circuit; and a condenser adapted to shunt said fixed and variable resistances.

8. A method for proportioning a fluid into a moving fluid stream, comprising establishing a pressure differential across the said moving stream; measuring the said differential in terms of a difference in height of liquid columns; periodically terminating the action of said differential on said columns to permit said columns to seek the same level; maintaining said fluid to be introduced into said moving stream in a storage zone and passing said fluid therefrom at a constant predetermined rate, into said moving stream, while said columns seek the same level substantially simultaneously with termination of the action of said pressure differential on said columns.

9. A process of claim 8, wherein fluid is passed from said storage zone into a measuring tank and wherein said differential from said differential measuring means is re-established and said fluid is then gravitated from said measuring tank into said moving stream.

10. Apparatus comprising in combination a header conduit; means in said conduit for restricting flow of fluid therethrough; a U-tube type manometer operatively connected with said flow restricting means to measure pressure differential in said conduit; a first conduit connecting arms of said manometer to permit equalization of pressure across same; a first valve in said conduit; a mercury body; a first arm having a free-moving end, the said free-moving end being attractable to magnetic force, and adapted to be moved in and out of contact with said body of mercury; a flow differential measuring means operatively connected with said manometer to measure differential across said manometer; a second arm positioned with reference to said first arm so as to have one end movable toward and away from said first arm, operatively connected with said differential measuring means to have its said movable end moved responsive to differential measurement by said measuring means, and said movable end being magnetic; a first electrical conductor connected with said first arm at a point always out of contact with said mercury body; a second electrical conductor, connected with said mercury body; a timer; a first switch connected with said timer; a first electrical circuit containing said first switch and operatively connected with said first valve to move same to an operating position, in response to actuation by said timer through said first switch; a second electrical circuit containing said first switch connected with said first conductor and with said mercury body and said second conductor, when said second arm is in contact with said mercury body, whereby said second circuit is broken when contact of said mercury body with said first arm is broken, said second circuit being adapted to actuate a second switch described hereinafter; a first reservoir; a valved conduit extending from said reservoir; a second conduit connecting said first reservoir with said header; a third electrical circuit connected with said first switch and containing said second switch, and operatively connected with said reservoir conduit valve to move same into an operating position in response to actuation by said second switch, and said first switch through said timer.

11. Apparatus comprising a conduit; means associated with said conduit for inducing a pressure differential in said conduit when fluid is passed therethrough, responsive to rate of flow of said fluid therein; pressure differential measuring means adapted to measure said differential; means for terminating said differential from said differential measuring means; a mercury body; a first arm having a free-moving end, the said free-moving end being attractable to magnetic force, and adapted to be moved in and out of contact with said body of mercury; a second arm positioned with reference to said first arm, so as to have one end movable toward and away from said first arm, operatively connected with said pressure differential measuring means to have its movable end moved responsive to differential measurement by said measuring means, and said movable end being magnetic; a first electrical conductor lead connected with said first arm at a point always out of contact with said mercury body; a second electrical conductor lead connected with said mercury body; a first electrical circuit connecting with said first electrical conductor lead and with said mercury body and said second conductor lead, when said second arm is in contact with said mercury body, whereby said first circuit is broken when contact of said mercury body with said first arm is broken; a chamber, and a valved outlet therefor; an electrical switch-actuating means in said first circuit, responsive to current passed through said first circuit; a second electrical circuit; electrical switch means in said second circuit for controlling flow of current through said second circuit, and operatively connected with said switch-actuating means; and electrical valve-actuating means in said second circuit, responsive to current passed therethrough, operatively connected with said valve in said chamber outlet.

References Cited in the file of this patent

UNITED STATES PATENTS

| 701,428 | Walsh | June 3, 1902 |
| 812,451 | Rice | Feb. 13, 1906 |
| 1,969,366 | Green | Aug. 7, 1934 |
| 2,097,985 | Maryott | Nov. 2, 1937 |
| 2,275,638 | Miner | Mar. 10, 1942 |
| 2,283,100 | Shores | May 12, 1942 |
| 2,322,374 | Lowe | June 22, 1943 |
| 2,707,964 | Monroe | May 10, 1955 |

UNITED STATES PATENT OFFICE
CERTIFICATE OF CORRECTION

Patent No. 2,893,412                                    July 7, 1959

Jack J. Fox et al.

It is hereby certified that error appears in the printed specification of the above numbered patent requiring correction and that the said Letters Patent should read as corrected below.

Column 2, line 46, after "flow" insert -- of --; column 4, line 63, for "of first" read -- on first --; column 6, line 46, for "162" read -- 161 --; column 8, line 15, for "communcation" read -- communication --.

Signed and sealed this 12th day of January 1960.

(SEAL)
Attest:

KARL H. AXLINE
Attesting Officer

ROBERT C. WATSON
Commissioner of Patents